US010426673B2

(12) United States Patent
Budd, II et al.

(10) Patent No.: US 10,426,673 B2
(45) Date of Patent: Oct. 1, 2019

(54) PLATFORM ENTRANCE GATE SAFETY BARRIER FOR A MOBILITY VEHICLE LIFT

(71) Applicant: The Braun Corporation, Winamac, IN (US)

(72) Inventors: Alfred Lewis Budd, II, Winamac, IN (US); Robert Earl Bettcher, III, Winamac, IN (US)

(73) Assignee: The Braun Corporation, Winamac, IN (US)

( * ) Notice: Subject to any disclaimer, the term of this patent is extended or adjusted under 35 U.S.C. 154(b) by 265 days.

(21) Appl. No.: 15/444,461

(22) Filed: Feb. 28, 2017

(65) Prior Publication Data
US 2017/0252234 A1 Sep. 7, 2017

Related U.S. Application Data

(60) Provisional application No. 62/301,942, filed on Mar. 1, 2016.

(51) Int. Cl.
*A61G 3/06* (2006.01)
*B60P 1/44* (2006.01)

(52) U.S. Cl.
CPC ............ *A61G 3/062* (2013.01); *B60P 1/4457* (2013.01); *B60P 1/4492* (2013.01)

(58) Field of Classification Search
CPC .......... A61G 3/06; A61G 3/062; A61G 3/067; A61G 3/068; A61G 3/0808; A61G 2220/12; A61G 2220/14; A61G 2220/16; A61G 3/063; A61G 3/066; A61G 3/02; A61G 3/0245; B60R 9/06; B60R 5/041; B60P 1/435; B60P 1/4457; B60P 1/44;
(Continued)

(56) References Cited

U.S. PATENT DOCUMENTS 4,479,753 A * 10/1984 Thorley .................. A61G 3/06
187/243
4,664,584 A * 5/1987 Braun ...................... A61G 3/06
187/217
(Continued)

FOREIGN PATENT DOCUMENTS

JP 2002306535 A 10/2002
WO 03/065960 A2 8/2003

OTHER PUBLICATIONS

International Application Division Korean Intellectual Property Office; International Search Report for PCT/US2015/060297; dated Feb. 5, 2016; 3 pages; Republic of Korea.
(Continued)

*Primary Examiner* — Glenn F Myers
(74) *Attorney, Agent, or Firm* — Taft Stettinius & Hollister LLP; Stephen F. Rost

(57) ABSTRACT

A lift platform assembly coupled to a floor and capable of transitioning a lift platform between a stow position and a ground level position. The lift platform assembly has one or more arms coupling the lift platform to the floor, a gate mount coupled to the lift platform at an outboard end, a retention gate coupled to the gate mount at a first terminus, and a mount pivot axis defined through the gate mount and parallel to a lift platform plane. The retention gate pivots about the mount pivot axis as the lift platform assembly transitions from the ground level position to the stow position.

20 Claims, 8 Drawing Sheets

(58) Field of Classification Search
CPC ....... B60P 1/4435; B60P 1/4442; B60P 1/445; B60P 1/4414; B60P 1/4492; B60P 1/4421; B60P 1/4428; B60P 1/003; B66B 17/36; B66B 13/00; B66B 13/02; B66B 11/006; B66B 9/00; B66B 9/0853
See application file for complete search history.

(56) References Cited

U.S. PATENT DOCUMENTS

| | | | | |
|---|---|---|---|---|
| 5,284,414 A * | 2/1994 | Kempf | ................... | A61G 3/06 14/71.1 |
| 5,564,884 A * | 10/1996 | Farsai | ................... | B60P 1/44 414/540 |
| 5,680,976 A | 10/1997 | Koliopoulos et al. | | |
| 5,806,632 A * | 9/1998 | Budd | ................... | B66B 9/0853 187/200 |
| 5,971,465 A | 10/1999 | Ives et al. | | |
| 6,077,025 A | 6/2000 | Budd et al. | | |
| 6,086,314 A | 7/2000 | Savaria | | |
| 6,102,648 A * | 8/2000 | Fretwell | ................... | A61G 3/06 14/69.5 |
| 8,347,440 B1 * | 1/2013 | Runyan | ................... | B60P 1/435 14/71.1 |
| 2004/0146385 A1 | 7/2004 | Edwards et al. | | |
| 2004/0146386 A1 * | 7/2004 | Goodrich | ................... | A61G 3/06 414/546 |
| 2004/0228713 A1 | 11/2004 | Cohn et al. | | |
| 2006/0045671 A1 * | 3/2006 | Sobota | ................... | A61G 3/06 414/263 |
| 2006/0233632 A1 * | 10/2006 | Hayes | ................... | A61G 3/06 414/546 |

OTHER PUBLICATIONS

International Application Division Korean Intellectual Property Office; International Search Report and Written Opinion of the International Searching Authority for PCT/US2017/019823; dated May 30, 2017; 16 pages; Republic of Korea.

* cited by examiner

PLATFORM ENTRANCE GATE SAFETY BARRIER FOR A MOBILITY VEHICLE LIFT

RELATED APPLICATIONS

The present application claims the benefit of U.S. Provisional Application Ser. No. 62/301,942, filed Mar. 1, 2016, the disclosure of which is hereby incorporated by reference in its entirety.

TECHNICAL FIELD

The present teachings are generally related to a safety barrier for a lift platform, and more particularly to an entrance gate retention barrier for an elevated lift platform of a mobility vehicle.

BACKGROUND OF THE DISCLOSURE

The statements in this section merely provide background information related to the present disclosure and should not be construed as constituting prior art.

Vehicles adapted for mobility-challenged individuals are necessary in order to provide these individuals with the ability to visit locations requiring vehicular travel. To allow these individuals to enter and exit the vehicle, often times electrical or hydraulic powered wheelchair lifts or platforms are used. These lifts may include a horizontal platform that translates vertically to allow the wheelchair, walker or scooter occupant easy access from the ground level to the interior of the vehicle.

SUMMARY

In a first embodiment of the present disclosure, a wheelchair lift assembly for a vehicle having a vehicle floor includes a plurality of arms configured to be coupled to the vehicle floor; a platform assembly coupled at a first end thereof to at least one of the plurality of arms, the platform assembly including a floor surface that defines a lift platform plane, where the platform assembly is movable between a stowed position and an open position; a gate mount coupled to a second end of the platform assembly, the second end being opposite the first end, where the gate mount defines a first pivot axis; a gate including a first end and a second end, the first end being coupled to the gate mount; and a second pivot axis defined through the gate mount and parallel to the lift platform plane; wherein, the gate is pivotably relative to the platform assembly about the second pivot axis as the platform assembly moves between the stowed and open positions.

In one example of this embodiment, the first pivot axis is substantially perpendicular to the second pivot axis, and the gate is pivotable about the first pivot axis when the platform assembly is in the open position. In a second example, in the stowed position the gate is disposed substantially parallel with the lift platform plane. In a third example, in the open position the gate is disposed substantially perpendicular to the lift platform plane. In a fourth example, a roll stop plate is pivotally coupled to the platform assembly at the second end, wherein the gate is independently pivotable about the second pivot axis relative to the roll stop plate. In a fifth example, a latch member coupled to the gate; and a latch assembly coupled to the platform assembly; wherein, the latch assembly is removably coupled to the latch member.

In a further example, the gate is pivotable about the first pivot axis when the platform assembly is in the open position and the latch member is not coupled to the latch assembly; and the gate is restricted from pivoting about the first pivot axis when the latch member is coupled to the latch assembly. In yet a further example, a roll stop plate is pivotally coupled to the second end of the platform assembly; wherein, the roll stop plate is pivotable between a barrier position in which the roll stop plate is misaligned with the floor surface, and a planar position in which the roll stop plate is substantially aligned with the floor surface; wherein, the latch assembly is removably coupled to the roll stop plate in the barrier position.

In another embodiment of the present disclosure, a pivot base assembly for a lift platform having a stow position and a ground level position, includes a gate mount pivotally coupled to the lift platform about a mount pivot axis at a first platform side; a retention gate pivotally coupled to the gate mount about a gate axis; wherein the pivot axis is perpendicular to the gate axis; further wherein, the retention gate pivots about the mount pivot axis as the lift platform transitions between the stow position and the ground level position; further wherein, the retention gate is pivotable about the gate axis in the ground level position.

In one example of this embodiment, a gate mount stop is coupled to the lift platform; and a lift platform plane is defined through the surface of the lift platform; wherein the gate mount stop contacts the gate mount when the gate axis is about perpendicular to the lift platform plane. In a second example, a latch pivotally is coupled to the lift platform at a second platform side; and a latch member is coupled to the retention gate; wherein the latch selectively couples the latch member of the retention gate to the second platform side; wherein, when the latch is coupled to the latch member, the retention gate does not substantially rotate about the gate axis.

In a third example, when the latch is not coupled to the latch member of the retention gate, the retention gate is pivotable about the mount pivot axis. In a fourth example, a bump release plate is coupled to the latch; wherein when the lift platform is in the ground level position, the bump release plate contacts a ground surface to uncouple the latch member from the latch. In a fifth example, a roll stop plate is pivotally coupled to the lift platform and pivotable between a barrier position and a planar position; wherein the latch selectively couples the roll stop plate to the lift platform in the barrier position. In a further example, the roll stop plate restricts the retention gate from pivoting about the gate axis when the roll stop plate is in the barrier position.

In a further embodiment of this disclosure, a lift platform assembly configured to be coupled to a floor and transition a lift platform between a stow position and a ground level position, includes one or more arms coupling the lift platform to the floor; a gate mount pivotally coupled to the lift platform along a first platform side, the gate mount defining both a mount pivot axis and a gate axis therethrough; a retention gate pivotally coupled to the gate mount; a roll stop plate pivotally coupled to the lift platform at an outboard end and extending between the first platform side and a second platform side; and a latch assembly coupled to the lift platform at the second platform side and configured to selectively couple to the retention gate to the second platform side; wherein, when the latch assembly is not coupled to the retention gate and the lift platform is in the ground level position, the retention gate is pivotable about the gate axis away from the second platform side.

In one example of this embodiment, the latch assembly selectively couples the roll stop plate to the lift platform in a barrier position. In a second example, when the lift platform is in the ground level position, the retention gate is pivotable about the gate axis between a closed position and an opened position. In a third example, the roll stop plate is pivotable between a barrier position, where the roll stop plate provides a barrier along a planar surface of the lift platform; and a planar position, where the roll stop plate is substantially aligned with the planar surface of the lift platform; wherein the retention gate is restricted from transitioning from the closed position to the opened position when the roll stop plate is in the barrier position.

In a further example, a first vertically is disposed lift arm coupled to an inward portion of the lift platform at the first platform side; and a link arm couples the first vertically disposed lift arm to the gate mount; wherein, as the lift platform transitions from the stow position to the ground level position, the link arm pivots the gate mount about the mount pivot axis.

BRIEF DESCRIPTION OF THE DRAWINGS

The above-mentioned aspects of the present teachings and the manner of obtaining them will become more apparent and the teachings themselves will be better understood by reference to the following description of the illustrative embodiments taken in conjunction with the accompanying drawings, wherein.

Figure 1:
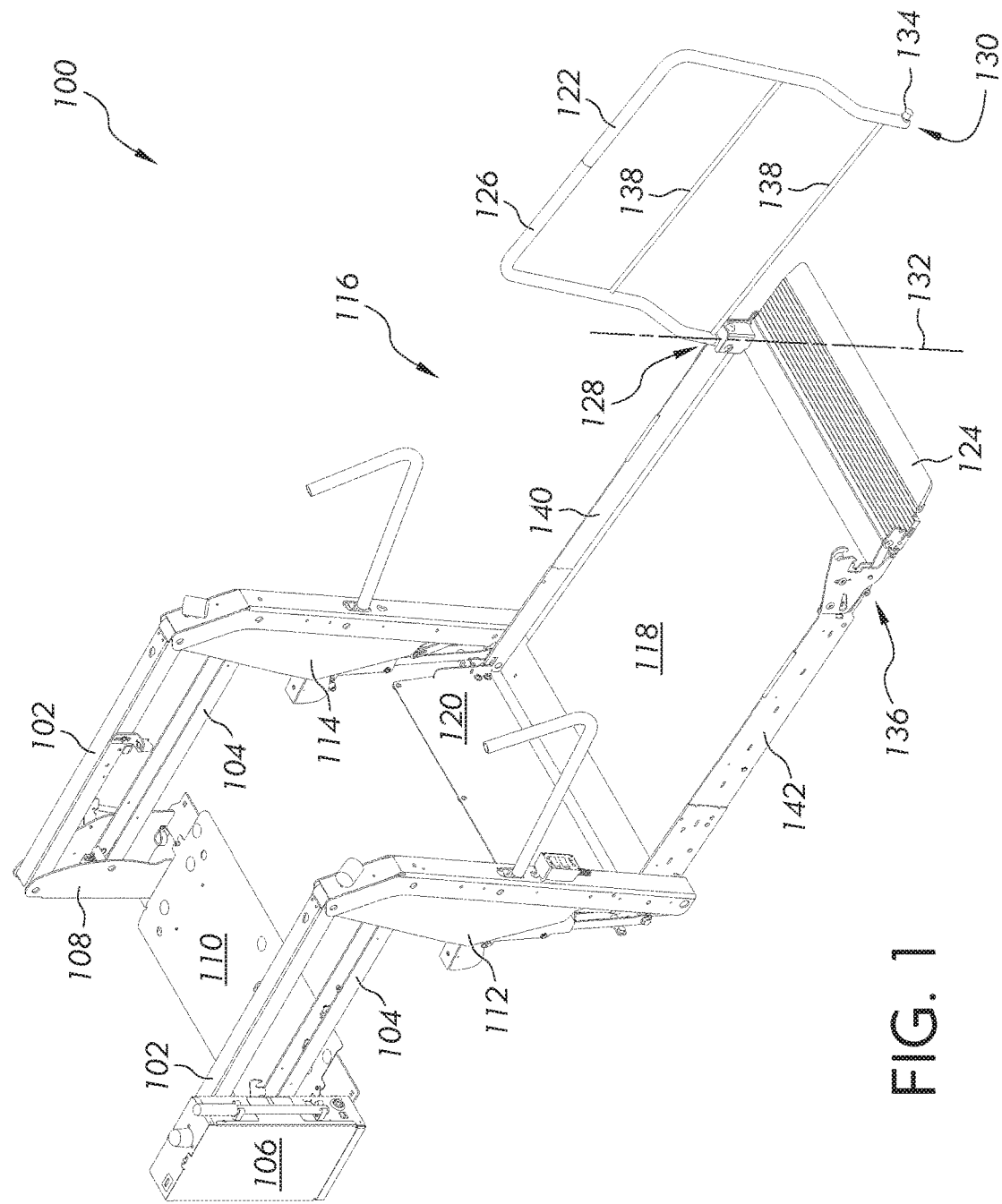
FIG. 1 represents a perspective view of a lift gate assembly at a ground level and with a retention gate in an opened position.

Corresponding reference characters indicate corresponding parts throughout the several views. Although the exemplification set out herein illustrates embodiments of the disclosure, in several forms, the embodiments disclosed below are not intended to be exhaustive or to be construed as limiting the scope of the disclosure to the precise forms disclosed.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

In this regard, the disclosure is illustrated in the several figures, and is of sufficient complexity that the many parts, interrelationships, and sub-combinations thereof simply cannot be clearly or meaningfully illustrated in a single patent-type drawing. Accordingly, several of the drawings show in schematic, or omit, parts that are not essential in that drawing to a description of a particular feature, aspect or principle of the disclosure being disclosed. Thus, the best mode of one embodied feature may be shown in one drawing, and the best mode of another feature will be called out in another drawing.

All publications and patent applications cited in this specification are herein incorporated by reference as if each individual publication or patent application were specifically and individually indicated to be incorporated by reference.

FIG. 1 is a perspective view of the lift platform entrance gate retention barrier assembly 100 of the disclosure as mounted to the outboard end of a typical parallelogram lift having upper and lower parallelogram arms 102, 104 that are configured to be installed to a first and second stanchion 106, 108 positioned on either side of a doorway of a vehicle. The parallelogram lift arms 102, 104 may be supported by the first and second stanchions 106, 108 which are mounted to the vehicle floor on the corresponding sides of a doorway (not particularly shown in FIG. 1) on doorway threshold plate 110. The lift stanchions may form part of a frame assembly for coupling the lift assembly to a vehicle floor. Each lift stanchion 106, 108 may pivotally mount the pair of upper and lower parallelogram arms 102, 104 which in turn pivotally connect with a generally vertically disposed lift arms 112, 114.

Figure 2:
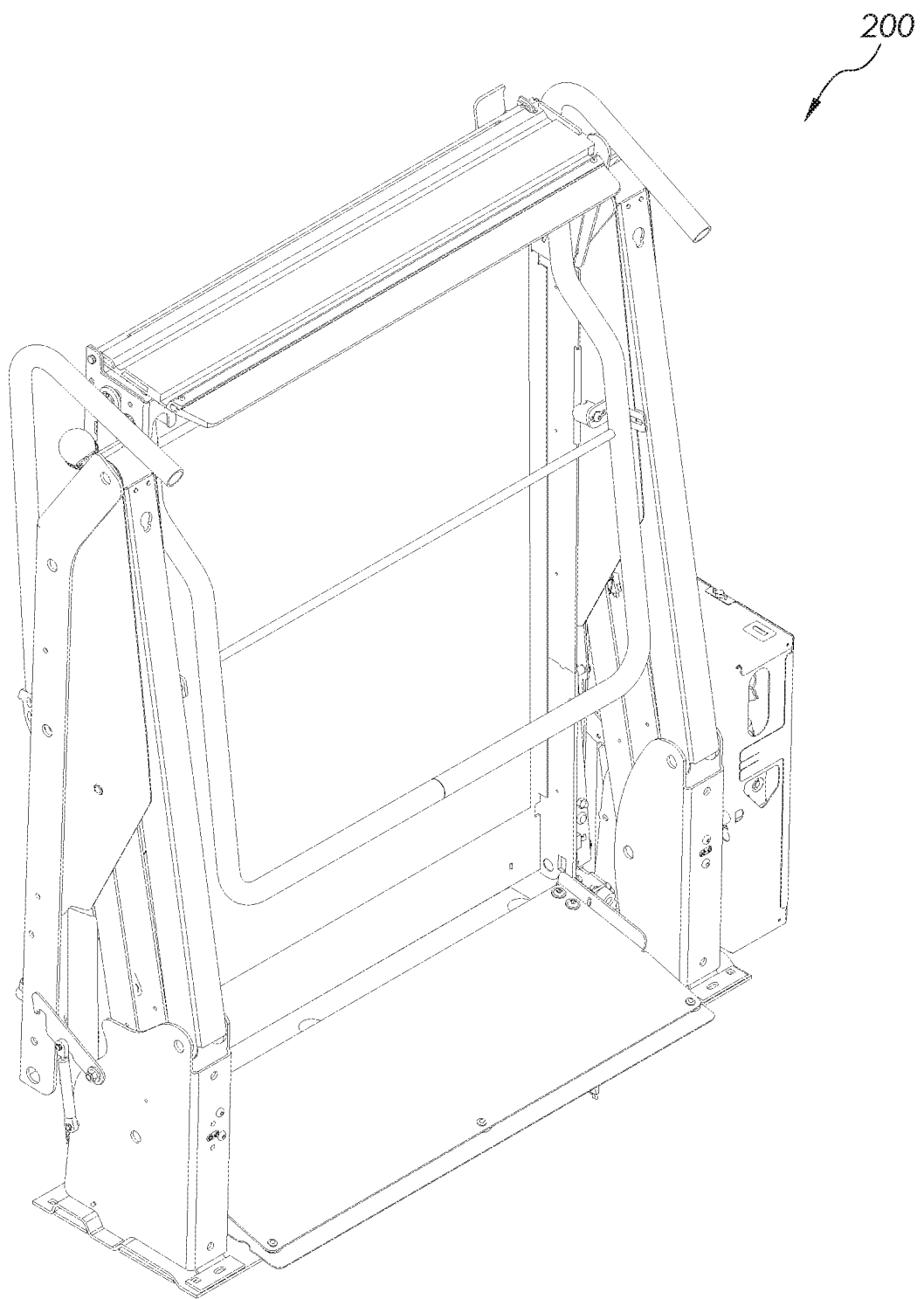
FIG. 2 represents a perspective view of the lift gate assembly in a stow position.
Figure 3:
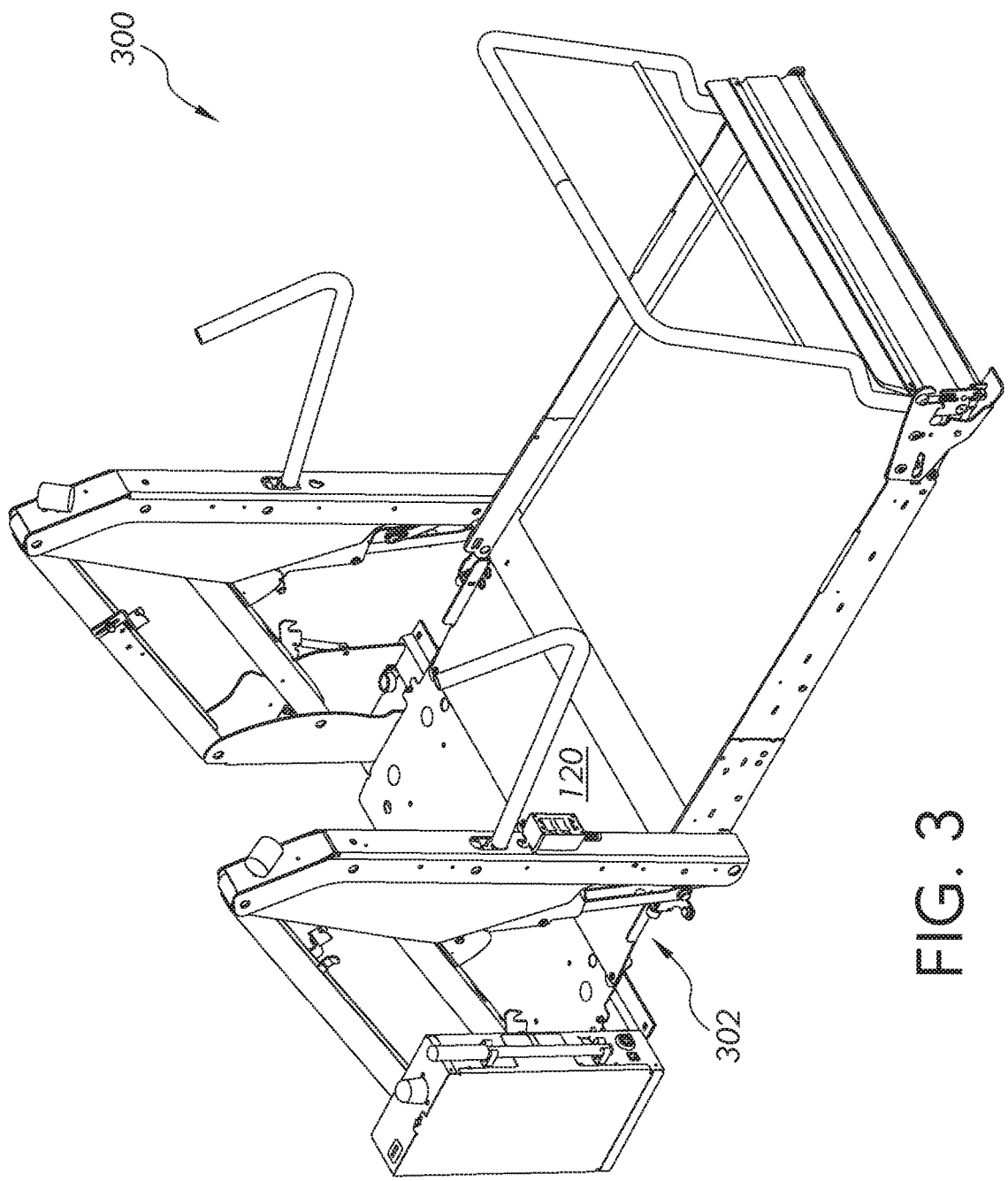
FIG. 3 represents a perspective view of the lift gate assembly at a transfer level or position.

A platform assembly 116 is mounted to and between the lower ends of the lift arms 112, 114. The platform assembly 116 is pivotally mounted so that it may be rotated from the transfer position upwards and inwards to a stow position 200 (FIG. 2). A platform floor 118 may define a platform floor plane along its surface and have sufficient structural characteristics to transport a user from the vehicle floor height to the ground level as will be described in more detail below. More specifically, in FIG. 1 the platform floor 118 may be substantially at the ground level loading position with a bridge plate 120 in an upturned position to form an inboard platform barrier. Bridge plate 120 may rotate to horizontal and overlaps a threshold 302 (FIG. 3) when the platform is raised to the transfer level or position 300, so as to form a transition structure to the vehicle floor. One exemplary lift and platform structure that may be used in accordance with the present disclosure is shown in U.S. Pat. No. 6,077,025, the application of which is hereby incorporated by reference in its entirety. In other lift designs, the bridge plate 120 may be mounted to the doorway threshold plate 110, and may form the portal boundary.

In one embodiment, forward and rear hydraulic cylinders (not shown) can be pivotally mounted diagonally across the corresponding lift parallelogram for moving the platform between the ground level position and the stowed position. In one example, a pump housing may also be mounted to one of the lift stanchions 106, 108 to selectively provide hydraulic fluid and pressure to the hydraulic cylinders to maneuver the lift gate assembly between the stowed and ground level positions.

The lift gate assembly 100 may have a pivotal retention gate 122 and a roll stop plate 124 positioned on an outboard portion of the lift platform 118. The retention gate 122 and the roll stop plate 124 may provide an outboard barrier pivotally coupled to the lift platform 118 that may selectively restrict a user from exiting the lift platform 118 in the outboard direction unless the lift gate assembly 100 is on the ground level 100. Once the lift gate assembly 100 is on the ground level as shown in FIG. 1, the roll stop plate 124 may pivot to become substantially aligned with the planar surface of the lift platform 118 and provide a transition threshold from the lift platform 118 to the underlying surface. Further, the retention gate 122 may be pivotally mounted to the lift platform 118 on one end and configured to pivot between an opened position (shown in FIG. 1) and a closed position (shown in FIG. 3).

More specifically, regarding the retention gate 122, a perimeter member 126 may be substantially U-shaped and extend between a first terminus 128 and a second terminus 130. The retention gate 122 may have one or more cross-members 138 extending between portions of the perimeter member 126. While specific details about the structure of the retention gate 122 have been shown and described above, this disclosure is not limited to any particular type of structure for the retention gate 122. More specifically, in one embodiment the retention gate 122 may be composed of one integral piece. In yet another embodiment the retention gate may not have a single perimeter member but rather have a plurality of structural components coupled to one another. Accordingly, this disclosure is not limited to any particular structural form for the retention gate 122.

The first terminus 128 may be pivotally coupled to the lift platform 118 and define a gate axis 132 about which the retention gate 122 may pivot. The second terminus 130 may have a latch member 134 coupled thereto. The latch member 134 may correspond with a latch assembly 136 and be selectively received therein. In one non-exclusive embodiment, the latch member 134 may only become uncoupled from the latch assembly 136 and pivoted about the gate axis 132 when the lift gate assembly 100 is at the ground level and the roll stop plate 124 is substantially planar with the lift platform 118. In yet another non-exclusive example, the platform assembly 116 may not transition from the ground level to any other position until the latch member 134 is positioned within the latch assembly 136.

Figure 4:
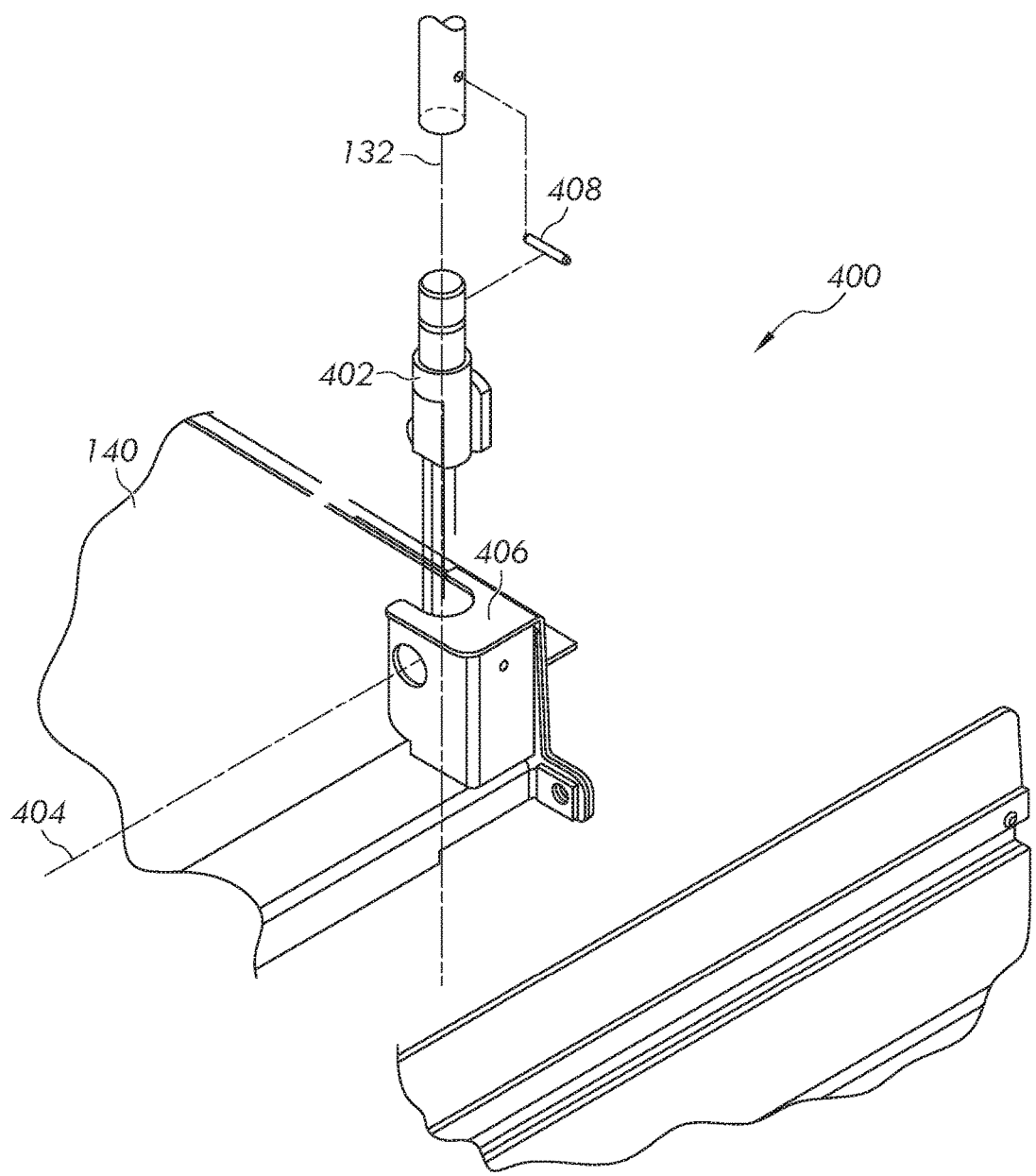
FIG. 4 represents a partial exploded view of a pivot base.

Now referring to FIG. 4, a partial expanded view of a pivot base 400 is shown. The pivot base may have a gate mount 402 that can be coupled to the first terminus 128 of the retention gate 122. The gate mount 402 may be mounted on an outboard portion of a first platform side 140 when the lift gate assembly 100 is in the ground position. Further, the gate mount 402 may be pivotally coupled to the first platform side 140 along a mount pivot axis 404. The mount pivot axis 404 may be substantially perpendicular to the gate axis 132 and allow the retention gate 122 to pivot about the mount pivot axis 404 relative to the lift platform 118.

The gate mount 402 may be configured to pivot about the mount axis 404 to thereby alter the angle of the gate axis 132 relative to the lift platform 118. In one non-exclusive example, the gate axis 132 may be pivoted about the mount pivot axis 404 between a first position (FIG. 3) and a second position (FIG. 2). When the gate mount is in the first position shown in FIG. 3, the gate axis 132 may be substantially perpendicular to the platform floor plane. However, when the gate mount 402 is in the second position shown in FIG. 2, the gate axis 132 may be slightly offset from being parallel with the platform floor plane. In other words, in one non-exclusive embodiment the gate mount 402 may pivot about 90 degrees around the pivot axis 404 relative to the lift platform 118.

The gate mount 402 may be positioned along the first platform side 140 to contact a gate mount stop 406 when the retention gate 122 is about perpendicular with the lift platform 118. More specifically, as the gate mount 402 pivots from the second position shown in FIG. 2 to the first position shown in FIG. 3 it may contact the gate mount stop 406 to restrict the retention gate 133 from pivoting any further.

The gate mount 402 may also be pivotally coupled to the first terminus 128 of the retention gate 122. In this non-exclusive example, the first terminus 128 is maintained in coaxial alignment with the gate mount 402 but may pivot about the gate axis 132. Accordingly, the retention gate 122 may also pivot axially about the gate axis 132.

The gate mount 402 may be configured to pivot about the mount pivot axis 404 using any known pivotal coupling mechanism. In one embodiment, bearings may be positioned between the gate mount 402 and the first platform side 140 where the gate mount 402 is coupled thereto. In this embodiment, the gate mount 402 may pivot about the mount pivot axis 404 with a reduced frictional resistance because of the mounting position of the bearings. Further still, in one embodiment one or more bushings may be used to reduce friction between the gate mount 402 and the first platform side 140 as the gate mount 402 pivots relative to the first platform side 140. In yet another embodiment, a pin or other coupler may be positioned through a through-hole of the gate mount 402 to allow the gate mount to pivot relative to the first platform side 140.

Similarly, the coupling location between the gate mount 402 and the first terminus 128 may utilize a bearing, bushing, or any other friction reducing mechanism or material to allow the retention gate 122 to pivot about the gate axis 132. In one embodiment, the first terminus 128 may be coupled to the gate mount to restrict the retention gate 122 from moving axially along the gate axis 132 away from the gate mount 402 but allow the retention gate 122 to pivot relative thereto. In one non-exclusive example, this may be achieved by positioning a pin 408 partially within the gate mount 402. The pin 408 may correspond with a radial slot (not specifically shown) in the first terminus 128. In terms of the connection between the retention gate 122 and the gate mount 402, the gate 122 is placed over the gate mount 402 until it contacts a shoulder, and the pin 408 locates a through hole in the gate 122 where it is then retained in grooves of the gate mount 402. Moreover, the radial slot may allow the retention gate 122 to pivot about the gate axis 132 while the pin 408 slides along the radial slot. However, the pin 408 may contact the radial slot to restrict the retention gate 122 from moving axially away from the gate mount 402. The particular method of pivotally coupling the retention gate 122 to the gate mount 402 is not limited to the embodiments described above. Rather, any known method of pivotally coupling two components to one another while restricting axial movement is considered.

Figure 5:
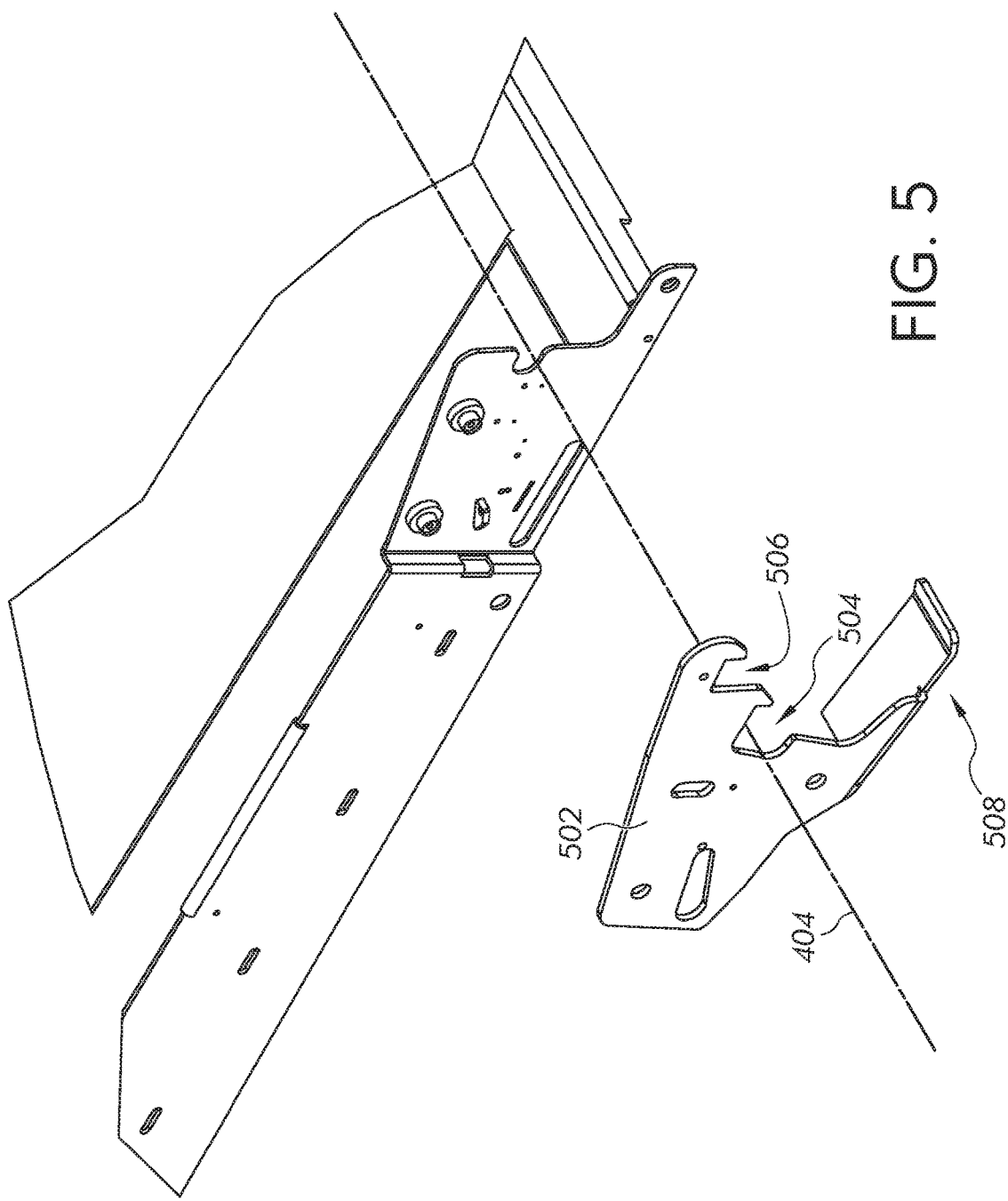
FIG. 5 represents a partial exploded view of a latch assembly.

Now referring to FIG. 5, the latch assembly 136 is shown and described in a partial exploded view. More specifically, a roll stop latch 502 may selectively couple both the roll stop plate 124 and the latch member 134 to the lift platform 118. The roll stop latch 502 may be coupled to a portion of the second platform side 142 and define a latch member receiver 504, a roll stop plate receiver 506, and a bump release plate 508.

The roll stop latch 502 may be pivotally coupled to the second platform side 142 to have a capture position (see FIG. 3) and a release position (see FIG. 1). When the roll stop latch 502 is in the capture position and the roll stop plate 124 and the latch member 134 are disposed therein, the latch member receiver 504 and the roll stop receiver 506 may restrict the respective latch member 134 and roll stop plate 124 from moving out of or de-coupling from their respective receivers 504, 506. Further still, the latch member receiver 504 and the roll stop receiver 506 may have a tapered leading edge that may contact the respective latch member 134 and roll stop plate 124. In this embodiment, if the roll stop latch 502 is in the capture position as the respective latch member 134 and/or roll stop plate 124 approach the latch member receiver 504 and/or the roll stop receiver 506 from an outside location, the tapered leading edge may temporarily transition the roll stop latch 502 to the release position to allow the respective latch member 134 and roll stop plate 124 to become positioned within the respective receiver 504, 506. The roll stop latch 502 may then transition back to the capture position and substantially retain the latch member 134 and roll stop plate 124 therein. In one nonexclusive example, the roll stop latch 502 may provide a force biasing the roll stop latch 502 in the capture position and only transition to the release position when an additional force overcomes the biasing force.

In one non-exclusive example, the roll stop latch 502 may retain a portion of the roll stop plate 124 within the roll stop plate receiver 506 as the lift gate assembly 100 moves from the transfer level or position 300 to the ground level shown in FIG. 1. The roll stop plate receiver 506 may ensure that the roll stop plate 124 remains substantially perpendicular to the lift platform 118 as the lift gate assembly 100 transitions between the ground level and the transfer level or position 300.

Similarly, the latch member receiver 504 may retain a portion of the latch member 134 therein as the lift gate assembly 100 moves from the transfer level or position 300 to the ground level shown in FIG. 1. The latch member receiver 504 may be defined along the mount pivot axis 404 described above. In this embodiment, when the latch member 134 is coupled to the latch 136 via the latch member receiver 504, the retention gate 122 may pivot about the mount pivot axis 404 as described in more detail above.

In one embodiment of the present disclosure, the latch member 134 of the retention gate 122 may be positioned inward of the roll stop plate 124 relative to the lift platform 118. In this embodiment, the retention gate 122 may be restricted from pivoting to an open position (as shown in FIG. 1) by both the latch member receiver 504 and the roll stop plate 124 as the lift gate assembly 100 transitions to or from the ground level. More specifically, if the latch member receiver 504 fails to properly engage the latch member 134, the roll stop plate 124 may restrict the retention gate 122 from pivoting to the open position of FIG. 1.

The bump release plate 508 of the roll stop latch 502 may be positioned to initially contact the underlying surface as the lift gate assembly 100 transitions to the ground position. As the lift gate assembly 100 becomes oriented in the ground position, the bump release plate 508 may contact the underlying surface and provide a force to the roll stop latch 502 to transition the roll stop latch 502 from the capture position to the release position. Once the roll stop latch 136 is in the release position, the roll stop plate 124 can transition from the substantially perpendicular orientation relative to the platform floor plane to the substantially planar orientation relative to the platform floor plane. Further, once the roll stop plate 124 is in the substantially planar orientation with the platform floor plane, the user may pivot the retention gate about the gate axis 128 and out of the latch mechanism receiver 504 to allow access to, and from, the lift platform 118 to the underlying surface.

Figure 6:
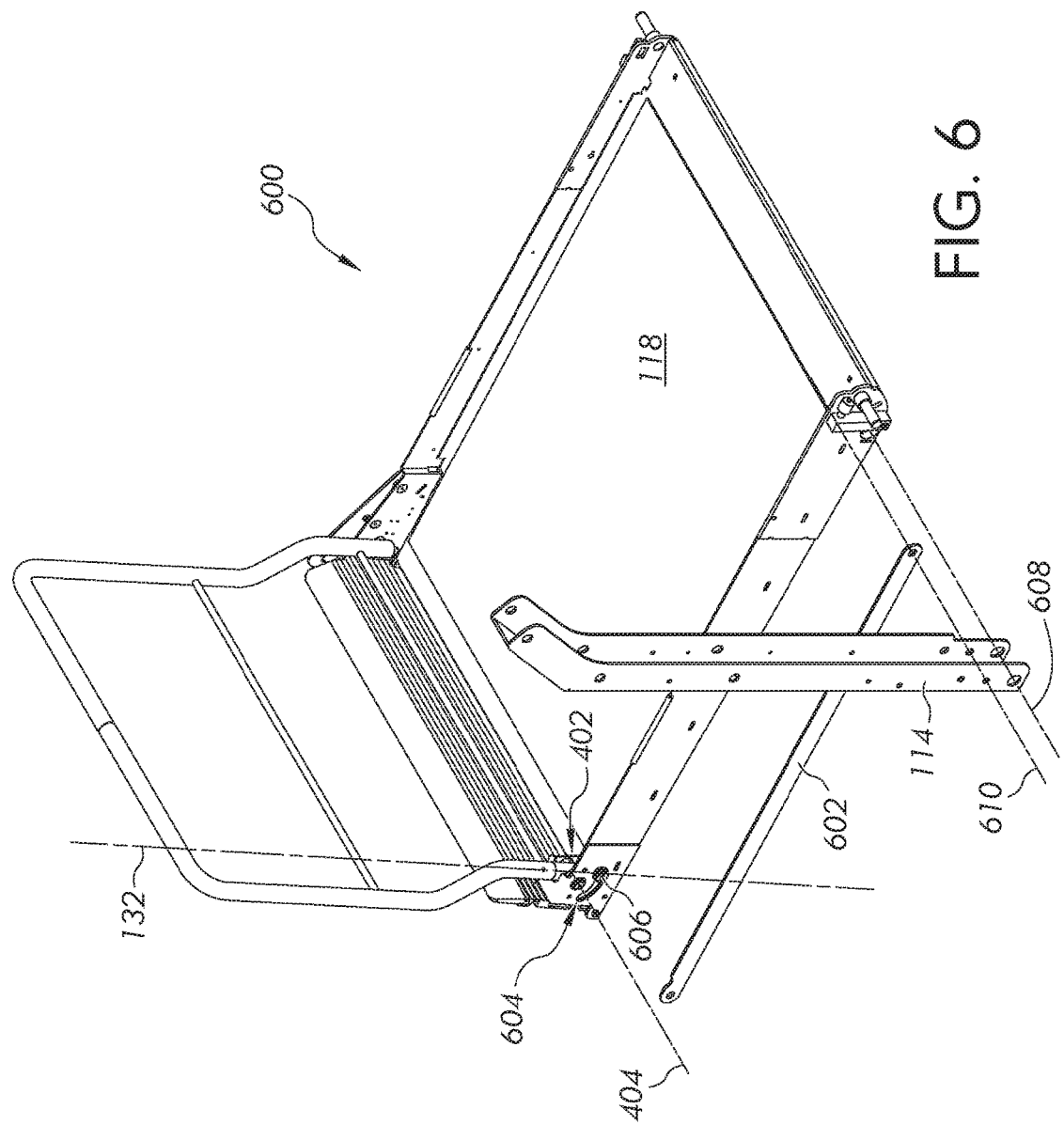
FIG. 6 represents a partial exploded view of a linkage assembly.

Now referring to FIG. 6, an exploded view of a linkage assembly 600 is shown. More specifically, the linkage assembly 600 may have a link arm 602 that extends from a bottom portion of the lift arm 114 towards the gate mount 402. The gate mount 402 may have a pivot pin 606 coupled thereto and positioned through an arc-shaped pivot slot 604. The pivot pin 606 may be offset from the mount pivot axis 404 away from the first terminus 128 of the retention gate 122. Further, the pivot slot 604 may similarly be offset from the mount pivot axis 404 and define an arc-shape concentric with the mount pivot axis 404.

The lift arm 114 may be pivotally coupled to the lift platform 118 at a lift arm axis 608 and the link arm 602 may be pivotally coupled to the lift arm 114 at a link arm axis 610. The link arm axis 610 may be offset from the lift arm axis 608 towards a center portion of the lift arm 114. In one non-limiting aspect of the present disclosure, the lift platform 118 may pivot about the lift arm axis 608 towards the lift arm 114 as it transitions from the transfer level or position 300 to a stow position 200 (FIG. 2). In this embodiment, the link arm 602 may pivotally couple the lift arm 114 to the gate mount 402 via the pivot pin 606. Accordingly, as the lift arm 114 and lift platform 118 transfer to the stow position 200, the link arm 602 may pivot the gate mount 402 about the mount axis 404 as the pivot pin 606 is forced to travel through the arc shaped pivot slot 604 by the link arm 602.

In one embodiment, the angle of gate mount 402 may be controlled by the link arm 602 and in turn the angle of the retention gate 122 relative to the lift platform 118 may also be controller by the link arm 602. More specifically, the retention gate 122 may pivot along with the gate mount 402 about the mount pivot axis 404 because it is pivotally coupled to the latch 136 at the second terminus 130. In other words, because the link arm axis 610 is offset from the lift arm axis 608, the gate mount 402 (and in turn the retention gate 122) is forced to pivot inward by the link arm 602 as the lift platform 118 transitions to the stow position 200.

Figure 7B:
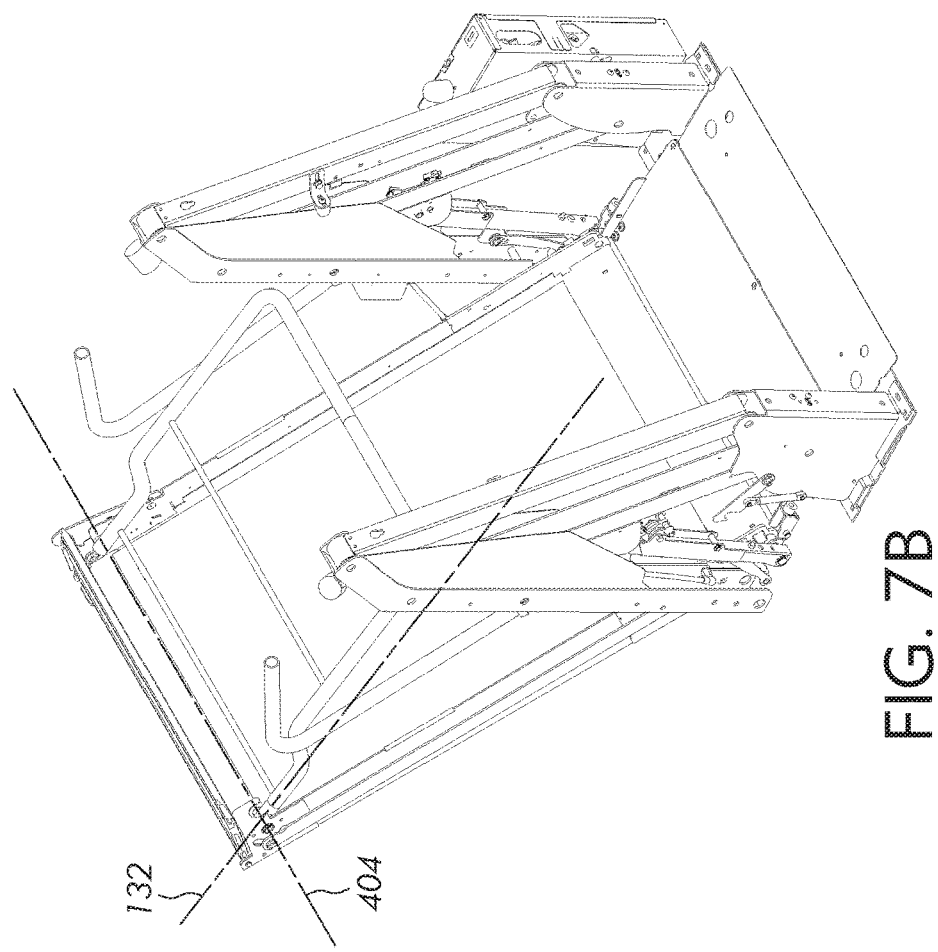
FIGS. 7A-7E represent the lift gate assembly as it transitions from the stow position to the ground level position.
Figure 7A:
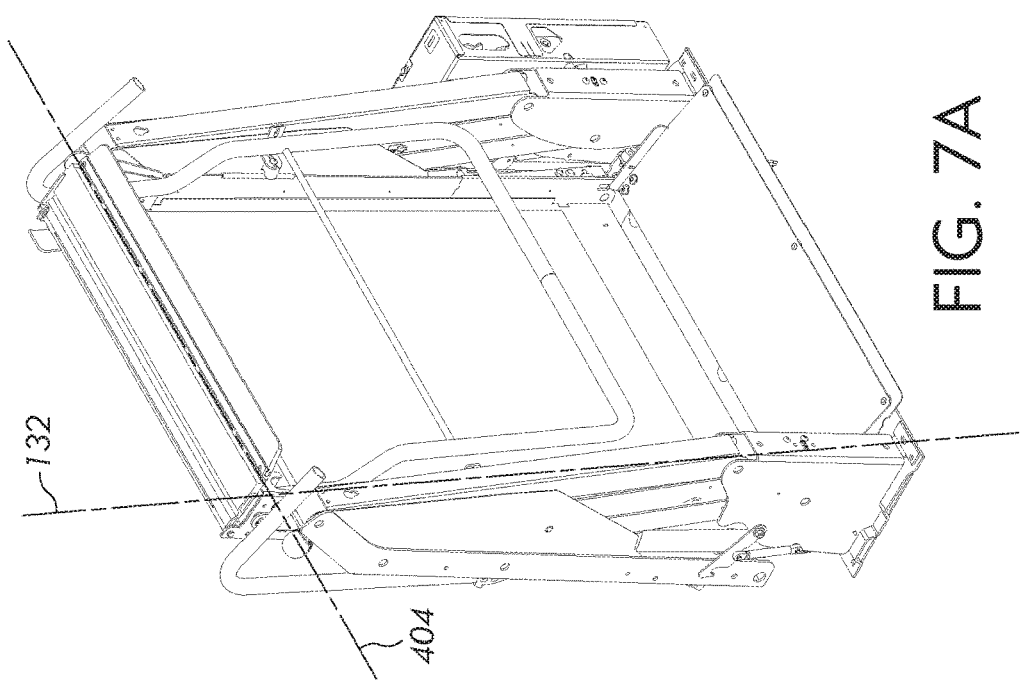
Figure 7C:
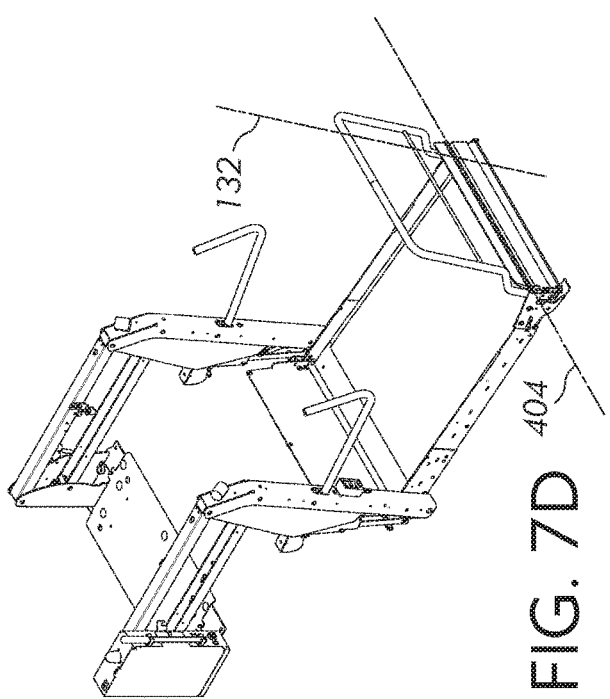
Figure 7D:
Figure 7E:
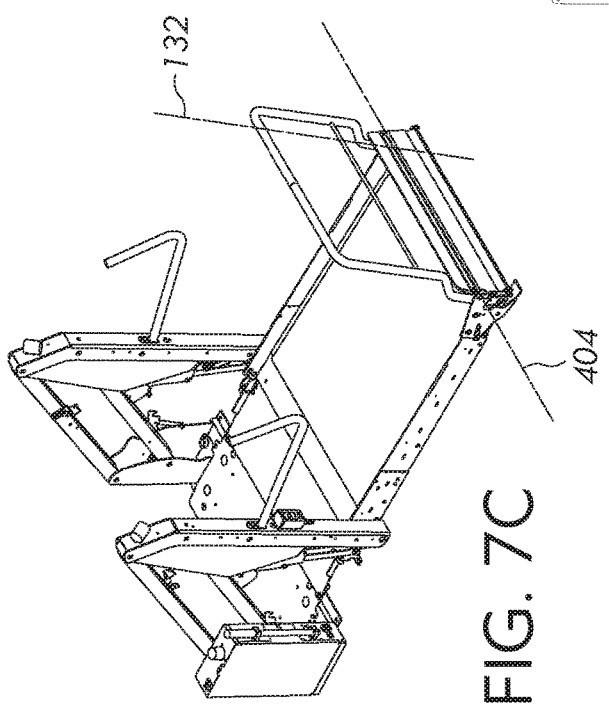

Referring to FIGS. 7A-7E, the lift assembly 100 is shown as it may be transitioned or maneuvered from its stowed position 200 (i.e., FIG. 7A) to its deployed or open position (FIG. 7E). The description herein of moving or transitioning the lift assembly 100 between its different positions or orientations is applicably shown in FIGS. 7A-7E.

In one embodiment of the present disclosure, a controller having a plurality of sensors in communication therewith may be part of the lift gate assembly 100. The controller may selectively engage one or more drive mechanisms to transition the lift gate assembly 100 between the ground position and the stow position 200. One of the plurality of sensors may be positioned at the latch member receiver 504 to identify when the latch member 134 is positioned therein. In this embodiment, when the lift gate assembly 100 is in the ground position, the controller will not initiate a raise operation until it receives a signal from the sensor indicating the latch member 134 is positioned within the latch 136. If the sensor identifies or detects the latch member 134 is positioned within the latch 136, the controller may begin initiating the raise operation by transitioning the roll stop plate 124 to the perpendicular position as described above. Then, the controller may engage a drive mechanism positioned between the upper parallelogram arms 102 and the lower parallelogram arms 104 to lift the lift platform to the transfer level or position 300. Next, the controller may engage one or more drive mechanisms to pivot the lift platform 118 towards the lift arms 112, 114 thereby causing the retention gate 122 to pivot inwardly towards the lift platform as described above.

In another embodiment, when the lift gate assembly 100 is at the ground position and the latch 136 is in the release position, the controller may engage a drive mechanism to pivot the retention gate 122 about the gate axis 132 to allow a user to exit the lift platform 118 onto the underlying surface. Similarly, if the controller is instructed to transition the lift gate assembly 100 from the ground position to the transfer level or position 300, the controller may first utilize the drive mechanism to transition the retention gate 122 to the closed position wherein a sensor may determine whether the latch member 134 is properly positioned within the latch 136 before continuing the raise operation.

In yet another embodiment, the retention gate 122 may transition between the perpendicular position (FIG. 3) and the stow position 200 of FIG. 2 via an independent drive mechanism. More specifically, instead of using the linkage assembly 600 described above, the retention gate 122 may have a geared electric motor, an actuator, or any other type of motor assembly coupled thereto. In this embodiment, sensors may be positioned at various locations on the lift assembly 100 to identify or detect when the lift assembly 100 is transitioning between the transfer level or position 300 and the stow position 200. In this embodiment, the controller may transition the retention gate 122 via the motor assembly coupled thereto based on the position of the lift assembly identified by the one or more position sensors.

Further still, in one embodiment, the latch 136 may be transitioned between the capture and release positions described above with the controller rather than with physical contact with the underlying surface. More specifically, the controller may have a sensor positioned along an underside of the lift platform. When the sensor identifies that the lift platform 118 is sufficiently close to the underlying surface, the controller may transition the latch 136 to the release position and allow the roll stop plate to become oriented in planar alignment with the lift platform and further allow the retention gate 122 to pivot about the gate axis 132 to the opened position.

While exemplary embodiments incorporating the principles of the present disclosure have been disclosed herein, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A wheelchair lift assembly for a vehicle having a vehicle floor, comprising:
   a plurality of arms configured to be coupled to the vehicle floor;
   a platform assembly coupled at a first end thereof to at least one of the plurality of arms, the platform assembly including a floor surface that defines a lift platform plane, wherein the platform assembly is movable between a stowed position and an open position;
   a gate mount coupled to a second end of the platform assembly, the second end being opposite the first end, wherein the gate mount defines a first pivot axis;
   a gate including a first end and a second end, the first end being coupled to the gate mount; and
   a second pivot axis defined through the gate mount and parallel to the lift platform plane;
   wherein the gate is pivotable relative to the platform assembly about the second pivot axis as the platform assembly moves between the stowed and open positions.

2. The lift assembly of claim 1, wherein the first pivot axis is substantially perpendicular to the second pivot axis, and the gate is pivotable about the first pivot axis when the platform assembly is in the open position.

3. The lift assembly of claim 1, wherein when the platform assembly is in the stowed position the gate is disposed substantially parallel with the lift platform plane.

4. The lift assembly of claim 1, wherein when the platform assembly is in the open position the gate is disposed substantially perpendicular to the lift platform plane.

5. The lift assembly of claim 1, further comprising a roll stop plate pivotally coupled to the platform assembly at the second end, wherein the gate is independently pivotable about the second pivot axis relative to the roll stop plate.

6. The lift assembly of claim 1, further comprising:
   a latch member coupled to the gate; and
   a latch assembly coupled to the platform assembly;
   wherein, the latch assembly is removably coupled to the latch member.

7. The lift assembly of claim 6, wherein:
   the gate is pivotable about the first pivot axis when the platform assembly is in the open position and the latch member is not coupled to the latch assembly; and
   the gate is restricted from pivoting about the first pivot axis when the latch member is coupled to the latch assembly.

8. The lift assembly of claim 6, further comprising a roll stop plate pivotally coupled to the second end of the platform assembly;
   wherein, the roll stop plate is pivotable between a barrier position in which the roll stop plate is misaligned with the floor surface, and a planar position in which the roll stop plate is substantially aligned with the floor surface;
   wherein, the latch assembly is removably coupled to the roll stop plate when the roll stop plate is in the barrier position.

9. A pivot base assembly for a lift platform movable between a stowed position and a ground level position, comprising:
   a gate mount pivotally coupled to the lift platform about a mount pivot axis at a first platform side;
   a retention gate pivotally coupled to the gate mount about a gate axis;
   wherein the mount pivot axis is perpendicular to the gate axis;
   further wherein the retention gate pivots about the mount pivot axis as the lift platform transitions between the stowed position and the ground level position;
   further wherein the retention gate is pivotable about the gate axis when the lift platform is in the ground level position.

10. The pivot base assembly of claim 9, further comprising:
    a gate mount stop coupled to the lift platform; and
    a lift platform plane defined through a surface of the lift platform;
    wherein the gate mount stop contacts the gate mount when the gate axis is about perpendicular to the lift platform plane.

11. The pivot base assembly of claim 9, further comprising:
    a latch pivotally coupled to the lift platform at a second platform side; and
    a latch member coupled to the retention gate;
    wherein the latch selectively couples the latch member to the second platform side;
    wherein, when the latch is coupled to the latch member, the retention gate does not substantially rotate about the gate axis.

12. The pivot base assembly of claim 11, further wherein when the latch is not coupled to the latch member, the retention gate is pivotable about the mount pivot axis.

13. The pivot base assembly of claim 11, further comprising:

a bump release plate coupled to the latch;

wherein when the lift platform is in the ground level position, the bump release plate contacts a ground surface to uncouple the latch member from the latch.

14. The pivot base assembly of claim 11, further comprising:

a roll stop plate pivotally coupled to the lift platform and pivotable between a barrier position and a planar position;

wherein the latch selectively couples the roll stop plate to the lift platform when the roll stop plate is in the barrier position.

15. The pivot base assembly of claim 14, further wherein the roll stop plate restricts the retention gate from pivoting about the gate axis when the roll stop plate is in the barrier position.

16. A lift platform assembly configured to be coupled to a floor and transition a lift platform between a stowed position and a ground level position, comprising:

one or more arms coupling the lift platform to the floor;

a gate mount pivotally coupled to the lift platform along a first platform side, the gate mount defining both a mount pivot axis and a gate axis therethrough;

a retention gate pivotally coupled to the gate mount;

a roll stop plate pivotally coupled to the lift platform at an outboard end and extending between the first platform side and a second platform side; and a latch assembly coupled to the lift platform at the second platform side and configured to selectively couple the retention gate to the second platform side;

wherein when the latch assembly is not coupled to the retention gate and the lift platform is in the ground level position, the retention gate is pivotable about the gate axis away from the second platform side.

17. The lift platform assembly of claim 16, further wherein the latch assembly selectively couples the roll stop plate to the lift platform when the roll stop plate is in a barrier position.

18. The lift platform assembly of claim 16, further wherein when the lift platform is in the ground level position, the retention gate is pivotable about the gate axis between a closed position and an opened position.

19. The lift platform assembly of claim 18, further wherein the roll stop plate is pivotable between:

a barrier position, wherein the roll stop plate provides a barrier along a planar surface of the lift platform; and a planar position, wherein the roll stop plate is substantially aligned with the planar surface of the lift platform;

wherein the retention gate is restricted from transitioning from the closed position to the opened position when the roll stop plate is in the barrier position.

20. The lift platform assembly of claim 16, further comprising:

a first vertically disposed lift arm coupled to an inward portion of the lift platform at the first platform side; and a link arm coupling the first vertically disposed lift arm to the gate mount;

wherein, as the lift platform transitions from the stowed position to the ground level position, the link arm pivots the gate mount about the mount pivot axis.

\* \* \* \* \*